2,391,857

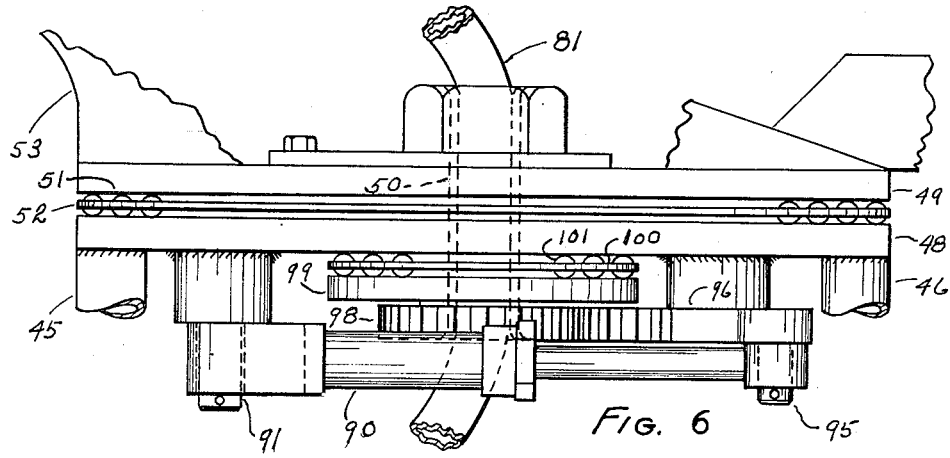
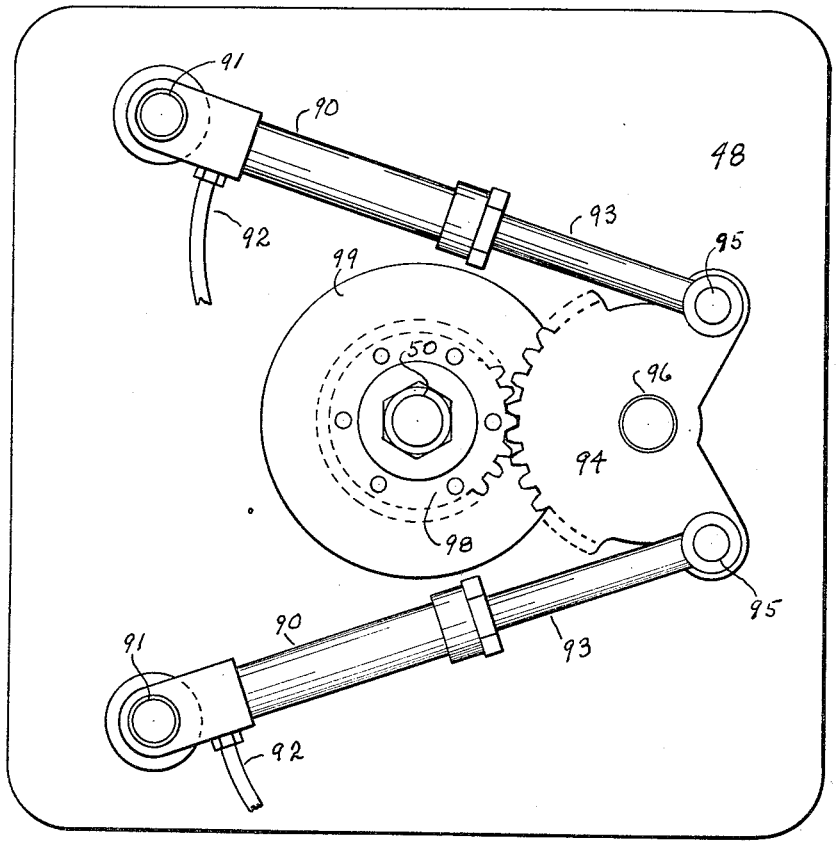
Fig. 6
Fig. 5
INVENTORS
BRUNO F. ARPS
FREDERICK B. ARPS
BY *A. Strole*
ATTORNEY Patented Jan. 1, 1946

UNITED STATES PATENT OFFICE 2,391,857

LOADING ATTACHMENT FOR TRACTORS

Bruno F. Arps and Frederick B. Arps, New Holstein, Wis., assignors to Arps Corporation, New Holstein, Wis., a corporation of Wisconsin Application February 19, 1945, Serial No. 578,720

6 Claims. (Cl. 214—132)

The present invention refers to an attachment for tractors having a scoop or the like adapted to be loaded when in a lowered position using the tractor to push the scoop into the material, and having means whereby the scoop may be raised and then dumped at will, either in front or on either side of the tractor.

An object of our invention is to provide a device which is hydraulically operated for raising, lowering and swinging the scoop sidewise.

Other objects of our invention are to provide means whereby the controlling levers are positioned within convenient reach of the tractor operator, including the means for dumping the scoop.

An important object of the present invention is to provide as near as possible a gravity balanced device throughout its operation and a ball bearing support for the turn table so as to reduce to a minimum the power required for swinging the scoop sidewise after being loaded and to more nearly equalize the load on the tractor wheels when the scoop is swung sidewise.

A further object of our invention is to provide a scoop attachment which can be easily and quickly attached and detached from the tractor.

Another object of our invention is to provide a bumper on the front end of the attachment and adjustably locate this bumper so the pressure required to push the scoop into the material may be supplied by its contact with the bumper.

To these and other useful ends our invention consists of parts, combinations of parts, or their equivalents, and mode of operation, as hereinafter described and claimed and shown in the accompanying drawings in which:

Fig. 5 is a bottom view illustrating in detail the hydraulic means for swinging the scoop sidewise.

Fig. 6 is a side view of the device as shown in Figure 5.

Fig. 7 is a fractional section of the device taken on line 7—7 of Figure 2, illustrating the mounting of the front end of the attachment to the front end of the tractor frame.

Fig. 8 illustrates a different type of scoop or pick up receiver than that shown in the other figures.

Figure 1:
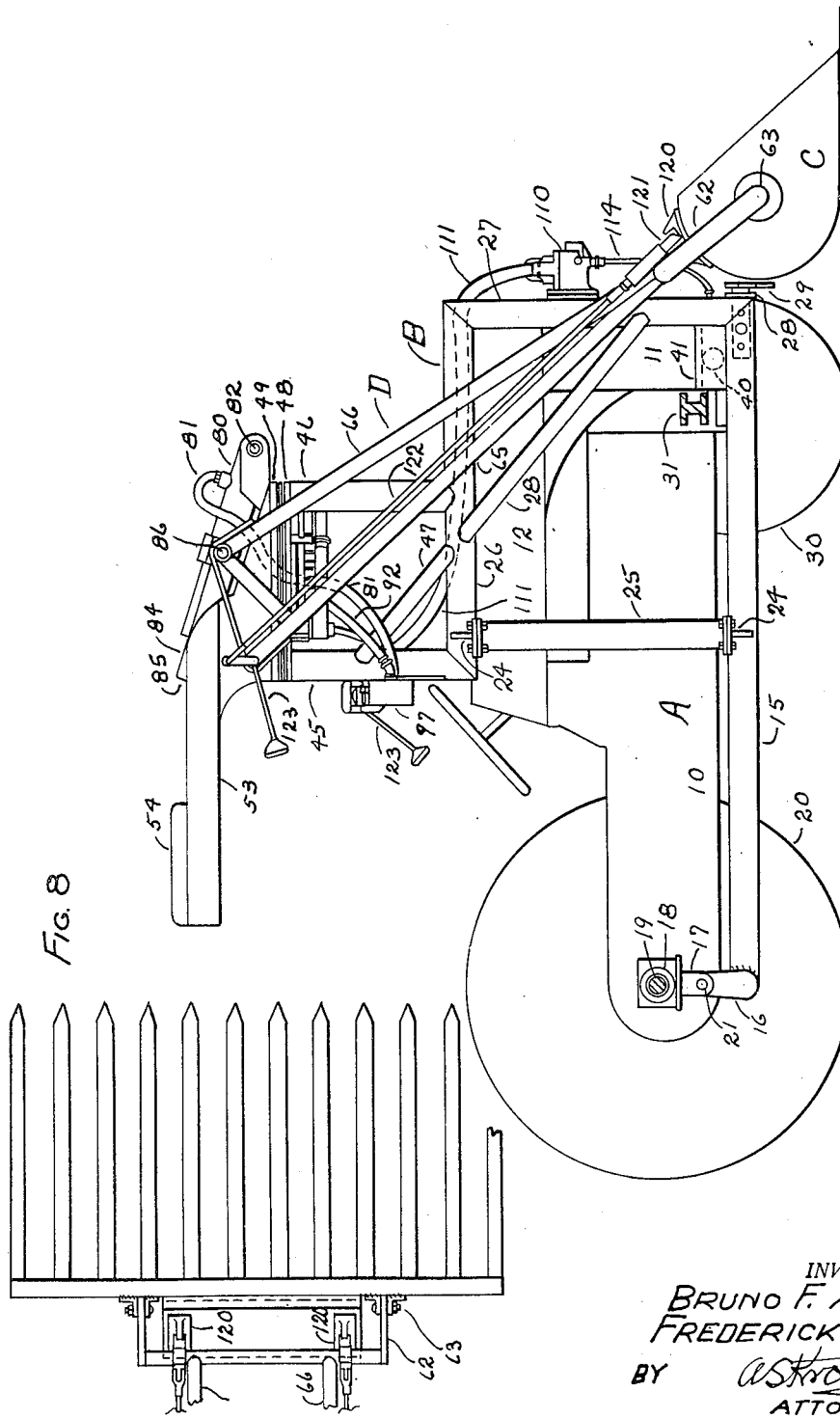
Fig. 1 is a side elevational view of our device attached to a conventional tractor with the scoop in a loading position.

As thus illustrated the tractor in its entirety is designated by reference character A; the scoop supporting frame in its entirety is designated by reference character B; the scoop is designated by reference character C and the scoop supporting mechanism which is mounted on member B is designated in its entirety by reference character D.

Figure 2:
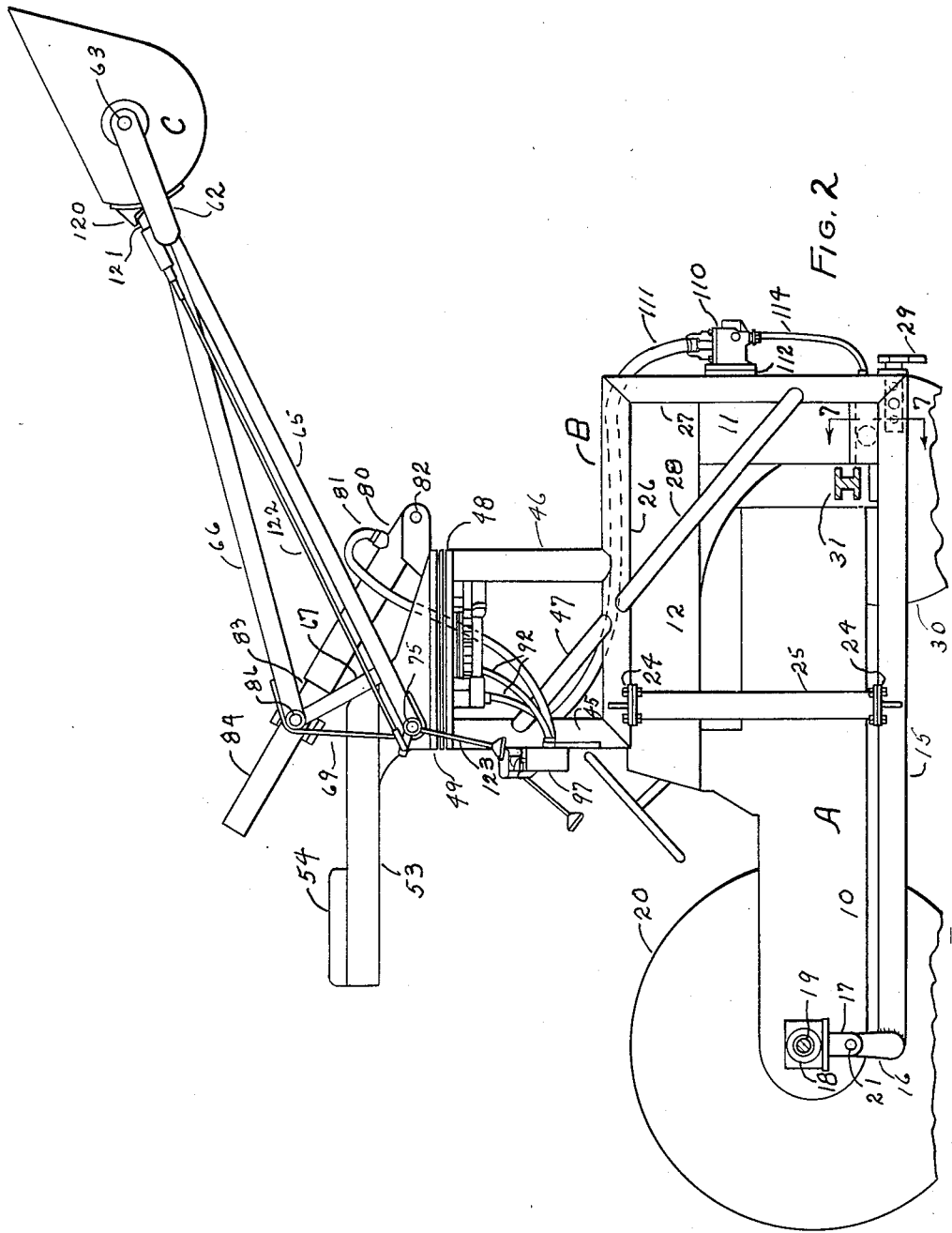
Fig. 2 is a view similar to Figure 1 except with the scoop in a raised position.
Figure 3:
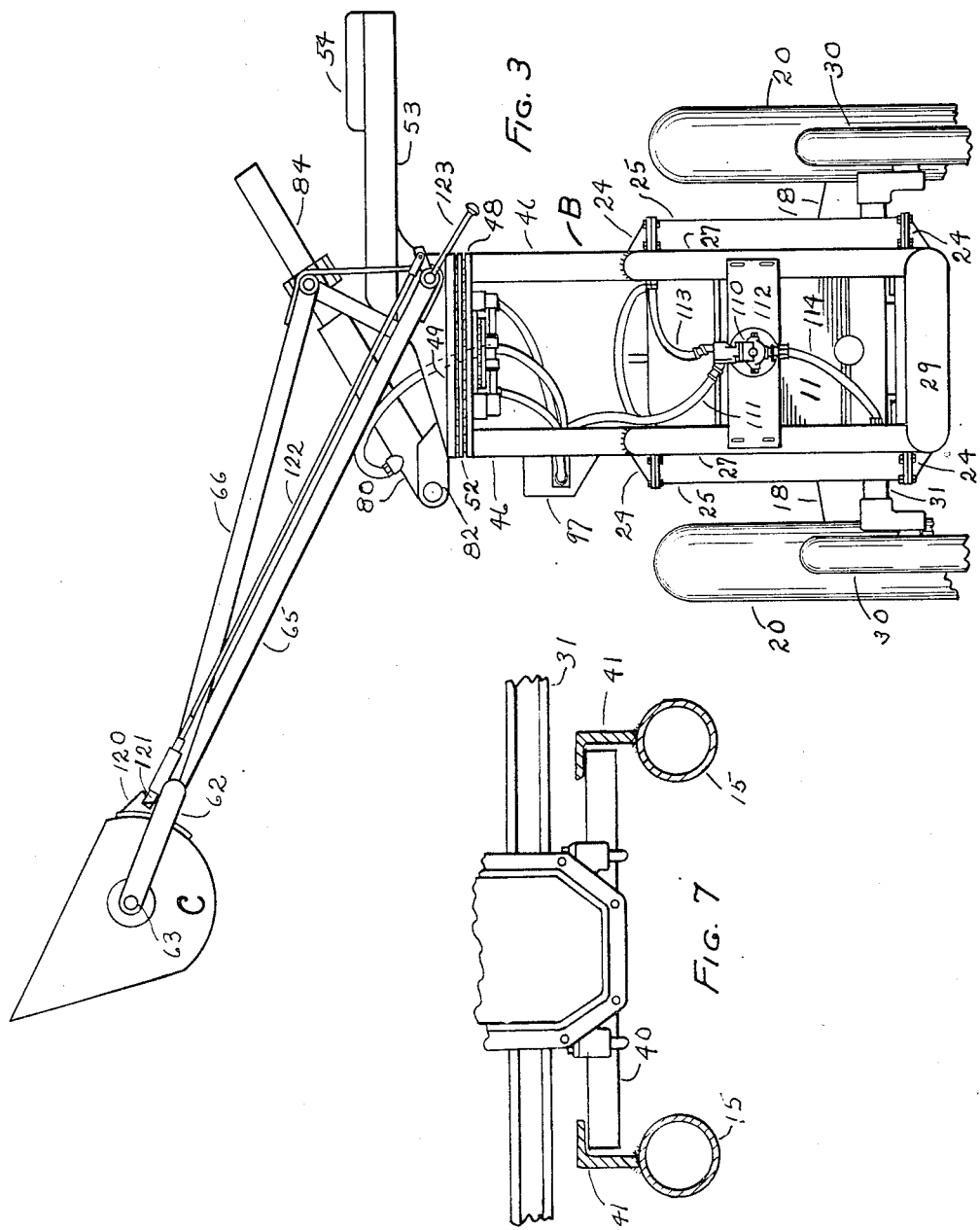
Fig. 3 is a front view of the device similar to that shown in Figure 2, except that the scoop is swung to the right for dumping the material at one side of the tractor.

The near wheels in Figures 1 and 2 are removed so as to more clearly illustrate the remainder of the device. The tractor frame is designated by numeral 10, the radiator for cooling the cooling fluid of the tractor, as is the custom in tractors of the type, is designated by numeral 11; the fuel tank 12 is supported at its front end on the top of radiator 11 and extends rearwardly, the rear end being supported on an extension of frame 10, as illustrated in Figures 1 and 2. The engine (not shown) is mounted in rear of member 11 and under member 12.

Member B is designed so it may be quickly attached and detached from the tractor and is constructed preferably as follows:

Side members 15—15 are preferably made from tubes and having brackets 16—16 secured to their rear ends and extending upwardly and being attached to drawbar brackets 17—17 (one not shown). This bracket is attached either to the tractor frame or to the two outwardly extending axle housings 18—18 through which axles 19 extend and to the outer ends of which the ground wheels 20—20 are secured. Members 16 are preferably secured to members 17 by means of pins or bolts as at 21. We may elect to dispense with member 16 and extend members 17 so members 15 may be secured directly thereto.

Intermediate the ends of members 15 we removably mount posts 25—25 by means of offset brackets 24—24 which are in turn, and in the same manner, secured to top frame members 26—26. To the forward end of members 26 we secure posts 27—27 these posts are preferably at right angle to members 26 and 15 and are secured to these members preferably by electric welding. Frame braces 28 are secured to members 26 and 27 as illustrated.

At the forward end of members 15 we adjustably secure a bumper plate 29, whereby this plate may be adjusted fore and aft, for a purpose which will hereinafter appear. The front wheels 30 are hingedly supported on front axle 31, automobile style, and the axle is longitudinally pivoted to the tractor frame in any well known manner.

The forward ends of members 15 are supported on the tractor as follows:

A cross tube 40 (see Figure 7) is rigidly attached to the forward end of the tractor frame. We secure L irons 41—41 to the forward ends of tubes 15 and the front ends of these members are similarly secured to members 27, the upper flanges of members 41 extending inwardly and over member 40. Thus when frame B is moved to the position shown in Figures 1 and 2 and the rear end is secured to members 17, frame B will be rigidly held and supported in a fixed position on the tractor. To attach member B to the tractor, members 25 are first removed, and the tractor either driven into the frame or the frame moved into position over the tractor after which members 25 are replaced into position, and members 16 attached to members 17.

Member B includes a sub-frame comprising tube members 45—45 which are attached to the rear ends of members 26. Other tube members 46—46 are secured to members 26 in the position shown in Figures 1 and 2. Members 45 are additionally secured to members 26 by means of braces 47. On the top of members 45 and 46 we securely mount a base plate 48, and a pintle 50 is rotatably mounted in this member. Member 49 is secured to pintle 50 and is adapted to carry the scoop mechanism. We therefore provide smooth adjacent surfaces on members 48 and 49 and mount therebetween a multiplicity of spaced balls 51 (see Figure 6), which are positioned in openings in a cage 52, so that all of the weight of member 49 and the parts connected thereto are supported on ball bearings of a considerable diameter for a purpose which is obvious.

We provide a rearward extension 53 on member 49 having a weight 54 adapted to practically balance the overhanging weight of the scoop and its load.

Our scoop mechanism comprises member C which is pivoted to the front ends of a U-shaped frame 62 as at 63—63, having secured thereto rearwardly extending arms 65 and 66. These arms are arranged in spaced pairs as clearly illustrated in the figures. Members 65 and 66 diverge rearwardly, the rear ends being held in spaced relation by means of braces 67—67. Other braces 69—69 act to strengthen the frame formed by these members. The rear ends of members 65 are pivotally mounted in spaced relation on member 49 as at 75—75. The frames thus formed are spaced apart far enough so scoop C may be lowered to the positions shown in Figure 1.

Figure 4:
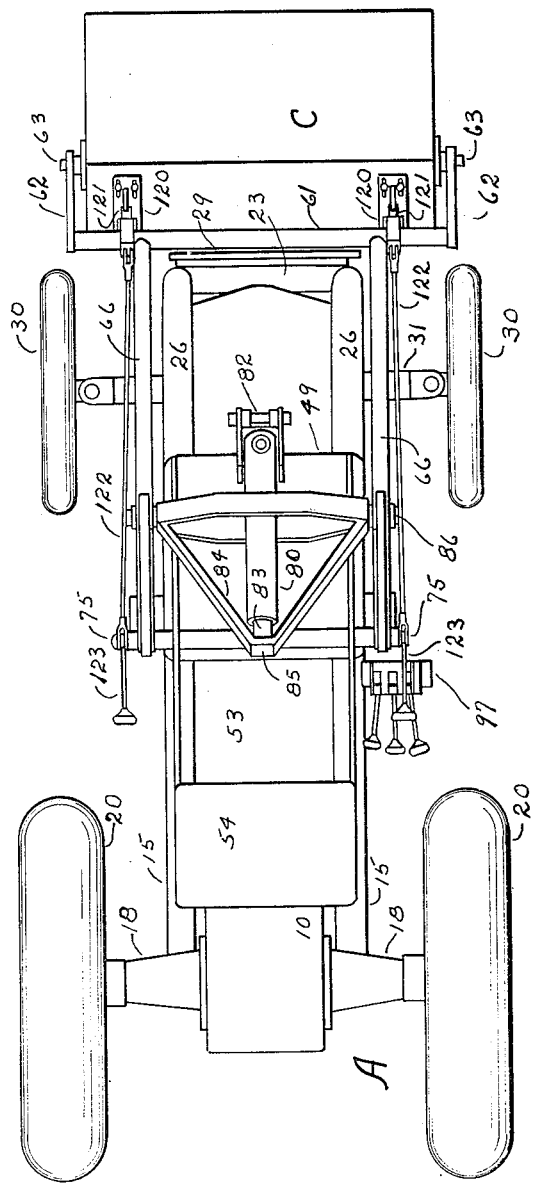
Fig. 4 is a top view of the device as shown in Figure 1.

We provide means for raising and lowering scoop C on pivots 75 as follows:

We provide a hydraulic cylinder 80 having a supply tube connection 81 at its closed end and being hingedly mounted at its front end to member 49 as at 82—82. Cylinder 80 is provided with a piston 83, the free end being secured to the apex of a frame 84, as at 85 and frame 84 is pivoted to the rear end of members 66 as at 86; thus it will be seen that when oil pressure is directed into the cylinder through tube connection 81, piston 83 will be moved outwardly so the scoop and its frame structure will be raised on pivots 75 as an axis. Pivots 82 and 86 provide for free action of the device. Thus it will be seen that when the scoop is in the position shown in Figures 1 and 4, piston 83 will be in its forward position in the cylinder and that by the application of oil pressure the scoop is raised and by permitting the escape of the oil pressure the scoop will be lowered by gravity.

We provide means for turning member 49 on base plate 48 and as follows:

Cylinders 90—90 are vertically pivoted to member 48 as at 91—91, each cylinder having connected to its closed end, oil supply tubes 92—92. We provide pistons 93—93 which are pivotally connected to a sector plate 94, as at 95—95, the sector plate being pivotally mounted on member 48 as at 96. Tubes 81 and 92 lead to a controlling valve box 97, this valve box having means so the operator may supply pressure to cylinders 80 or 90 at will, for turning member 49 or for raising scoop C independently. Pintle 50 is secured to a gear 98 which meshes the gear teeth on member 94. Gear 98 is secured to a plate 99, which is spaced a short distance from member 48 and having therebetween a ball carrying race 100, with a multiplicity of spaced balls 101, so the lifting or tilting of member 49 is carried on ball bearings 101.

It will be seen, for example, that by manipulating the valve associated with tubes 92 so as to add pressure to the right hand cylinder 90 and permit the escape of oil from the left hand cylinder, member 94 will be turned in one direction and that by reversing this order, member 94 will be turned in the other direction, and that this action will turn gear 98 and pintle 50 and in turn, turn member 49. It will be noted that gear 94 is larger in diameter than member 98 whereby the scoop may be turned 90° or more in either direction.

It will be understood that member 97 has separate valves for controlling the action of pistons 83 and 93 and that the controlling levers on member 97 will be within easy reach of the tractor operator. Clearly the raising and lowering of scoop C and the turning of this scoop to the right or left is under convenient control of the operator and because of ball bearings 51 and 101, a minimum volume of oil and minimum pressure will be required; in other words the device will operate economically.

We provide an oil pump which in its entirety is designated by reference numeral 110, tubes 111 and 113 forming operating connections from this pump to valve box 97 and tube 27 as illustrated. Tube 114 forms a drain connection from the pump housing into one of the tubes 27. Tubes 27 at their bottoms are secured together by means of a tube 23, and portways are formed between tubes 23 and 27 and between one of the tubes 45, and its adjacent tubes 26 and 27. An outlet oil connection from valve box 97 is made into the adjacent tube 45 and the tubes are therefore adapted to act as an oil reservoir to which all of the oil is drained and from which the pump is supplied with oil. Pump 110 is mounted on a plate 112 which is secured to members 27. Pump 110 is supplied with a V-belt pulley (not shown) another pulley (not shown) being secured to the front end of the crank shaft of the engine and a V-belt (not shown) forms an operating connection between the engine and pump.

Scoop pivots 63 are located on the side plates of the scoop so the forward end of the scoop when loaded is heavier than the rear and when empty the rear is heavier than the front. We provide brackets 120—120 on the rear of scoop C and spring controlled latches 121—121 are slidably mounted on member 61 and are adapted to engage members 120 and hold member C in its loading position. Latches 121 are provided with operating connections 122 to interconnected control levers 123—123, positioned within reach of the operator, so by pushing on one of these levers the scoop will be released and permitted to dump its load. It may be said that scoop C when once dumped of its load will be caused to return by gravity to the position shown in the figures. It will be noted that at least one of members 123 will at all times be within reach of the operator whether the scoop is in a forward position or turned to the right or left.

To load the scoop it is lowered to a loading position and pressed into the material by moving the tractor forward. At times particularly in loading the scoop when in the position shown in Figure 1, the scoop is permitted to rest against bumper 29 thus applying direct pressure from frame B to the scoop. Member 29 being adjustable may be positioned so as to contact the scoop when in the position shown in Figure 1 or in a higher or lower position than shown.

Thus it will be seen that applicant has provided a scoop attachment for tractors which is easily attached and detached and that the operating mechanism of the scoop is substantially balanced but mounted on ball bearings in a manner whereby the scoop may be conveniently loaded, raised, and swung to one side of the tractor for dumping into another vehicle if desired and that when the loaded scoop is swung to one side of the tractor it will not cause the tractor to tip sidewise or place an excessive load on one or the other side wheels, because of members 53 and 54.

Clearly many minor detailed changes may be made in the design shown without departing from the spirit and scope of the appended claims.

Having thus shown and described our invention, we claim:

1. In a tractor, in combination with a pick up and dump scoop, comprising a frame on the top of which is mounted the scoop carrying mechanism, said frame being adapted to clear the sides and top of the tractor and front axle thereof when moved longitudinally into position on the tractor, anchoring means at the forward lower corners of the frame adapted to engage a transverse member rigidly secured to the front end of the tractor, the lower side members of said frame extending rearwardly and being adapted to be attached to the rear end of the tractor, said scoop mechanism comprising a turn-table rotatably mounted on the top of said frame, spaced apart members horizontally hinged at their rear ends to the turn-table and at their front ends to the scoop, an overhanging weight positioned on said turn-table on the opposite side from the scoop to thereby generally counterbalance the weight of the scoop and its load, said turn-table and the top of said frame having therebetween a relatively large diameter antifriction bearing, a hydraulic pump associated with the engine of said tractor, hydraulic rams associated with said turn-table and scoop mechanism for lifting the scoop and turning the table, valve controlling means operatively connected to said pump and rams and means whereby the scoop lifting ram and turn-table moving rams may be operated independently, said frame member consisting of certain tubes interconnected together and adapted to act as an oil supply reservoir for receiving the discharged oil from the rams and supplying the pump with oil.

2. In a tractor, in combination with a pick up and dump scoop, comprising a frame on the top of which is mounted the scoop carrying mechanism, said frame being adapted to clear the sides, top and front axle of the tractor when moved longitudinally into position on the tractor, anchoring means at the forward lower corners of the frame adapted to engage a transverse member rigidly secured to the front end of the tractor, the lower side members of said frame, extending rearwardly and being adapted to be attached to the rear end of the tractor, the mechanism of said scoop comprising a turn-table rotatably mounted on said frame and having spaced apart frame members horizontally hinged at their rear ends to said turn-table and at their front ends to the scoop, an overhanging weight positioned on said turn-table on the opposite side from the scoop to thereby generally counterbalance the weight of the scoop and its load, a hydraulic pump operatively connected to the engine of the tractor, a hydraulically operated ram adapted to move said scoop from a loading to an unloading position and hydraulic rams adapted to turn said scoop mechanism in either direction.

3. In a tractor, in combination with a pick up and dump scoop device comprising, a frame on the top of which is vertically rotatably mounted a turn table, a scoop mechanism mounted on said turn table, anchoring means on the forward lower corners of said frame, a transverse member rigidly secured to the front end of the tractor, the ends of which are adapted to engage said anchoring means, the lower side members of said frame being extended rearwardly and being detachably secured to the rear end of the tractor, said scoop mechanism comprising booms, their rear ends being horizontally hinged to the turn table, and being adapted to clear the sides of the frame and turn table when in a forward and lowered position, an adapter frame secured to the front ends of said booms, a dump scoop transversely hinged to said adapter frame, an overhanging weight secured to said turn table on the rear side thereof, the lower side members of said frame being positioned under the front axle of the tractor, the upper portion of said frame being secured to said lower side members by means of four spaced posts, the rear posts being removably secured to the frame, the front two of said posts being positioned in front of the front axle of the tractor, whereby by removing said rear posts, the device may be moved rearwardly into position on the tractor, a hydraulic ram mounted on the top of said turn table, adapted to raise and lower said scoop, other hydraulic means mounted on said frame, having a connection to said turn table, adapted to move the scoop to the right or left of the tractor when the booms are raised so as to clear said frame, a hydraulic pump associated with the engine of the tractor and a manually operated valve associated with the pump having operating connections to said rams.

4. In a tractor, in combination with a pick up and dump scoop device comprising, a frame on the top of which is vertically rotatably mounted a turn table, a scoop mechanism mounted on said turn-table, said frame being adapted to clear the sides and top of the tractor, when moved longitudinally into position on the tractor, anchoring means on the forward lower corners of said frame, a transverse member rigidly secured to the front end of the tractor, adapted to engage said anchoring means, the lower side members of said frame being extended rearwardly, their rear ends being attached to the rear end of the tractor, said scoop mechanism comprising booms, their rear ends being horizontally hinged to the turn table, and being adapted to clear the frame and turn table when in a forward and lowered position, an adapter frame secured to the front ends of said booms, a dump scoop transversely hinged to the adapter frame, a hydraulic pump associated with the engine of said tractor, separate hydraulic rams associated with said scoop mechanism and pump for lifting the scoop and for turning the turn table independently, holding latches on said adapter frame and catches on the scoop for holding the scoop in a loading position, hand controlled means operatively connected to said latches, whereby the scoop can be released manually for dumping.

5. A device as recited in claim 4 including, a longitudinally adjustable bumper mounted on the forward lower corner of said frame, adapted to engage the rear end of said scoop when the scoop is in its lowest position as determined by the position of the bumper.

6. In a tractor, in combination with a pick up and dump attachment comprising, a frame on the top of which is vertically rotatably mounted a turn table, having a material engaging, raising and dumping member, said frame being adapted to clear the sides and top of the tractor when moved longitudinally into position on the tractor, anchoring means at the forward lower corners of said frame, adapted to engage a transverse member rigidly secured to the front end of the tractor, the lower side members of said frame extending rearwardly and their rear ends being attached to the rear end of the tractor, said material engaging, raising and dumping member comprising spaced apart booms horizontally hinged at their rear ends to the turntable, their front ends being attached to an adapter, said material engaging member being transversely rotatably mounted on said adapter, locking means associated with said adapter and material engaging means for holding the material engaging means in a loading position, a hand controlled lever having links forming connections to said locking means whereby said locking means may be manually disengaged for dumping the material, a longitudinally adjustable bumper mounted on the forward lower corner of said frame adapted to contact the rear end of said material engaging means when in its lowest position as determined by the position of said bumper.

BRUNO F. ARPS.
FREDERICK B. ARPS.